United States Patent [19]

Gutekunst et al.

[11] 4,296,231
[45] Oct. 20, 1981

[54] CURABLE EPOXIDE RESIN MIXTURES

[75] Inventors: Ferdinand Gutekunst, Riehen; Rolf Schmid, Gelterkinden, both of Switzerland

[73] Assignee: Ciba-Geigy Corporation, Ardsley, N.Y.

[21] Appl. No.: 145,406

[22] Filed: May 1, 1980

[30] Foreign Application Priority Data

May 8, 1979 [CH] Switzerland .......................... 4307/79

[51] Int. Cl.³ .............................................. C08G 59/64
[52] U.S. Cl. ....................................... 528/93; 528/104; 528/111; 528/407; 528/408; 564/349; 564/504; 564/508
[58] Field of Search .................. 528/93, 104, 111, 407, 528/408; 564/349, 504, 508

[56] References Cited

U.S. PATENT DOCUMENTS

| | | | |
|---|---|---|---|
| 2,817,675 | 12/1957 | Hofer et al. | 564/349 X |
| 2,901,461 | 8/1959 | Auerbach et al. | 528/111 |
| 3,332,897 | 7/1967 | Renner et al. | 260/570.7 |
| 3,739,041 | 6/1973 | Schmid et al. | 260/835 |
| 3,892,526 | 7/1975 | Lafquist et al. | 428/474.4 |
| 4,089,826 | 5/1978 | Moss et al. | 260/29.2 EP |
| 4,108,922 | 8/1978 | Crescentini et al. | 528/111 X |
| 4,134,846 | 1/1979 | Machleder et al. | 252/51.5 A |
| 4,201,854 | 5/1980 | Zondler et al. | 528/93 |

FOREIGN PATENT DOCUMENTS

| | | |
|---|---|---|
| 783306 | 10/1955 | United Kingdom . |
| 998853 | 7/1965 | United Kingdom . |
| 1050678 | 12/1966 | United Kingdom . |
| 1169990 | 11/1969 | United Kingdom . |
| 1258454 | 12/1971 | United Kingdom . |

Primary Examiner—Earl A. Nielsen
Attorney, Agent, or Firm—Luther A. R. Hall

[57] ABSTRACT

The use of compounds of the formula

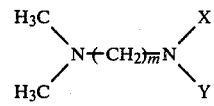

in which m is a number from 3 to 10, X is a grouping of the formula

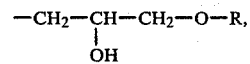

in which R is an alkyl having 4 to 10 C atoms or a phenyl which is unsubstituted or substituted by chlorine, bromine or alkyl or alkoxy each having 1 to 3 C atoms, and Y is a hydrogen atom or has the meaning defined for X, which are obtained by adding on 1 or 2 mols of an aliphatic or aromatic monoglycidyl ether to 1 mol of a dimethylaminoalkylamine, as a curing catalyst for epoxide resins or as a curing accelerator in curable mixtures consisting of epoxide resins and polycarboxylic anhydrides or polyhydric phenols.

10 Claims, No Drawings

CURABLE EPOXIDE RESIN MIXTURES

The present invention relates to curable mixtures of epoxide compounds, which contain an adduct of a dimethylaminoalkylamine and a monoglycidyl ether as the curing catalyst or as the curing accelerator when curing epoxide resins with polycarboxylic acid anhydrides or polyhydric phenols.

It is known to add curing accelerators, for example tertiary amines, to the curable mixtures when curing epoxide resins with polycarboxylic acid anhydrides or phenols. As can be seen from British Patent Specification No. 1,050,678, the addition of tertiary amines, for example benzyldimethylamine, when curing epoxide resins with polycarboxylic acid anhydrides has the effect of shortening the curing time, but does not lower the relatively high curing temperatures. In addition, the properties of the cured epoxide resins deteriorate when tertiary amines are added as accelerators. In order to counter these disadvantages, the use of imidazoles as curing accelerators for the anhydride-curing of epoxide resins is proposed in British Patent Specification No. 1,050,678. Imidazoles are very effective accelerators, compared with other known accelerators, but one-component systems which consist of epoxide resins and polycarboxylic acid anhydrides and contain imidazoles, such as compression moulding compositions or sintering powders, have the disadvantage of inadequate stability on storage.

It has now been found that the disadvantages described above can be largely avoided if adducts of dimethylaminoalkylamines and glycidyl ethers of monohydric aliphatic alcohols or phenols are used as the curing catalyst for epoxide resins or as the curing accelerator for curing epoxide resins with polycarboxylic acid anhydrides or with polyhydric phenols.

The present invention thus relates to curable mixtures which contain a polyepoxide compound with, on average, more than one epoxide group in the molecule, and, if desired, a polycarboxylic acid, an anhydride or a polyhydric phenol as the curing agent, the said mixtures additionally containing a compound of the formula I

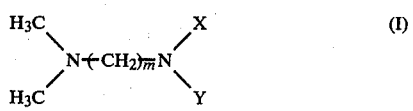

in which m is a number from 3 to 10, X is a grouping of the formula

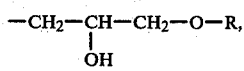

in which R is an alkyl having 4 to 10 C atoms or a phenyl which is unsubstituted or substituted by chlorine, bromine or alkyl or alkoxy each having 1 to 3 C atoms, and Y is a hydrogen atom or has the meaning defined for X, as the curing catalyst or as the curing accelerator for curing the epoxide compound with di- or poly-carboxylic acids or anhydrides of di- or poly-carboxylic acids or with polyhydric phenols, preferably by means of polycarboxylic acid anhydrides or polyhydric phenols.

Preferably, the mixtures contain a compound of the formula I in which m is 3, R is butyl, phenyl or tolyl and Y is a hydrogen atom or has the meaning defined for X.

If the compounds of the formula I are used as a catalytic curing agent for epoxide resins, the amount of the compound of the formula I in the curable mixture is 2 to 40 and preferably 3 to 10% by weight.

As mentioned initially, the compounds of the formula I are also valuable curing accelerators for curable epoxide resin mixtures which contain a polycarboxylic acid anhydride or a polyhydric phenol as the curing agent. In this case, the proportion of compounds of the formula I is 0.1 to 10 and preferably 0.2 to 2% by weight, based on the epoxide resin/curing agent mixture.

The compounds of the formula I, some of which are known compounds, can be prepared by the process disclosed in British Pat. No. 1,169,990 or in U.S. Pat. No. 3,332,997, by adding on 1 or 2 mols of a monoglycidyl ether of the formula III

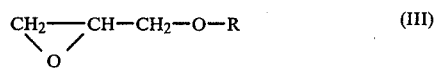

in which R is as defined for formula I, to 1 mol of an amine of the formula II

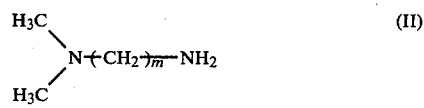

in which m is as defined for formula I, the addition reaction being carried out with heating.

The amines of the formula II and the monoglycidyl ethers of the formula III are known compounds.

Both British Patent Specification No. 1,169,990 and U.S. Patent Specification No. 3,332,997 disclose compounds which are obtained by reacting an amine containing a primary amino group with a glycidyl ether and which thus can also have the formula I indicated above if Y in formula I is a hydrogen atom. Whilst the compounds disclosed in British Patent Specification No. 1,169,990 are pharmacologically active substances, the compounds described in U.S. Patent Specification No. 3,332,997 are indeed used as curing agents for epoxide resins, but these compounds are employed only in equivalent amounts, i.e. the proportion of these compounds in the curable epoxide resin mixtures is such that there is 1 equivalent of amine hydrogen atom per 1 equivalent of epoxide group. On the other hand, the U.S. patent specification does not indicate that the compounds of the formula I can advantageously be used in catalytic amounts, either as curing agents for epoxide resins or as curing accelerators for curing epoxide resins by means of a polycarboxylic acid anhydride or polyhydric phenols.

Compounds of the formula I in which Y has the meaning defined for X are not disclosed in the patent specifications mentioned above. Compared with the compounds of the formula I which have been disclosed hitherto, these compounds have the advantage that they have a better storage stability in a mixture with epoxide resins.

The present invention thus also relates to compounds of the formula I in which m is a number from 3 to 10, preferably 3, and X and Y are each a grouping of the formula

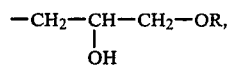

in which R is an alkyl having 4 to 10 C atoms or a phenyl which is unsubstituted or substituted by chlorine, bromine or alkyl or alkoxy each having 1 to 3 C atoms, and preferably are each a butyl, phenyl or tolyl.

All of the known categories of epoxide resins are suitable as epoxide resins which can be cured using the compounds of the formula I as the curing catalyst or curing accelerator. Suitable epoxide compounds are, in particular, those which have, on average, more than one glycidyl group, β-methylglycidyl group or 2,3-epoxycyclopentyl group bonded to a hetero-atom (for example sulfur and preferably oxygen or nitrogen); preferred compounds are bis-(2,3-epoxycyclopentyl) ether; di- and poly-glycidyl ethers of polyhydric aliphatic alcohols, such as 1,4-butanediol, or polyalkylene glycols, such as polypropylene glycol; di- or poly-glycidyl ethers of cycloaliphatic polyols, such as 2,2-bis-(4-hydroxycyclohexyl)-propane; di- and poly-glycidyl ethers of polyhydric phenols, such as resorcinol, bis-(p-hydroxyphenyl)methane, 2,2-bis-(p-hydroxyphenyl)-propane (=diomethane), 2,2-bis-(4'-hydroxy-3',5'-dibromophenyl)-propane and 1,1,2,2-tetrakis-(p-hydroxyphenyl)-ethane, or of condensation products of phenols and formaldehyde which are obtained under acid conditions, such as phenol novolacs and cresol novolacs; di- and poly-(β-methylglycidyl) ethers of the polyhydric alcohols or polyhydric phenols listed above; polyglycidyl esters of polybasic carboxylic acids, such as phthalic acid, terephthalic acid, Δ⁴tetrahydrophthalic acid and hexahydrophthalic acid; Nglycidyl derivatives of amines, amides and heterocyclic nitrogen bases, such as N,N-diglycidylaniline, N,N-diglycidyltoluidine and N,N,N',N'-tetraglycidyl-bis-(paminophenyl)-methane; triglycidyl isocyanurate; N,N'-diglycidylethyleneurea; N,N'-diglycidyl-5,5-dimethyl-hydantoin and N,N'-diglycidyl-5-isopropylhydantoin; N,N'-diglycidyl-5,5-dimethyl-6-isopropyl-5,6-dihydantoin and N,N'-diglycidyl-5,5-dimethyl-6-isopropyl-5,6-dihydrouracil.

Further suitable epoxide compounds are alicyclic diepoxides, such as limonene dioxide, dicyclopentadiene dioxide and ethylene glycol bis-(3,4-epoxytetrahydrodicyclopentadien-8-yl)-glycidyl ether, and also compounds containing two epoxycyclohexyl radicals, such as diethylene glycol bis-(3,4-epoxycyclohexanecarboxylate), bis-3,4-(epoxycyclohexylmethyl) succinate, 3',4'-epoxy6'-methylcyclohexylmethyl 3,4-epoxy-6-methylcyclohexanecarboxylate and 3',4'-epoxyhexanehydrobenzal-3,4-epoxycyclohexane-1,1-dimethanol.

Examples of di- and poly-carboxylic acids which can be used together with the curing accelerators to be used according to the invention, for curing epoxide resins, are: phthalic acid, isophthalic acid, terephthalic acid, 2,5-dimethylterephthalic acid, naphthalene-2,6-dicarboxylic acid, naphthalene-1,8-dicarboxylic acid, naphthalene2,3-dicarboxylic acid, diphenyl ether-4,4'-dicarboxylic acid, diphenyl-4,4'-dicarboxylic acid, benzenetricarboxylic acids, such as trimesic acid, trimellitic acid or hemimellitic acid, benzenetetracarboxylic acids, such as benzene-1,2,3,4-tetracarboxylic acid, benzene-1,2,3,5tetracarboxylic acid or pyromellitic acid, benzophenone3,3',4,4'-tetracarboxylic acid, naphthalenetetracarboxylic acid, perylenetetracarboxylic acid or tetracarboxylic acids of the formula

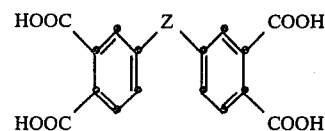

in which Z is a carbonyl, sulfonyl or methylene radical or an ether oxygen atom, for example benzophenonetetracarboxylic acid.

Examples of suitable aliphatic dicarboxylic acids are: malonic acid, succinic acid, adipic acid, 2,2,4trimethyladipic acid and 2,4,4-trimethyladipic acid and also mixtures thereof containing both isomers, sebacic acid, fumaric acid and maleic acid, and examples of suitable cycloaliphatic dicarboxylic acids are: tetrahydrophthalic acid, methyl-tetrahydrophthalic acid, isomerised 4-methyl-tetrahydrophthalic acid, endomethylene-tetrahydrophthalic acid, hexahydrophthalic acid, methylhexahydrophthalic acid, endomethylene-hexahydrophthalic acid, hexahydroterephthalic acid and hexadhydroisophthalic acid.

Further suitable acids are, for example, the tetracarboxylic acids of the formula

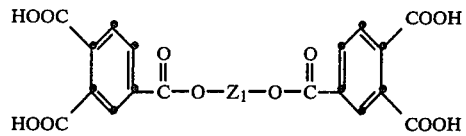

in which $Z_1$ is the divalent radical of an unsubstituted or substituted glycol, which are obtainable by reacting 2 mols of trimellitic acid anhydride with 1 mol of a glycol, or polyester-polycarboxylic acids, which are obtainable by reacting 3 mols of a carboxylic acid anhydride with 1 mol of a triol.

Examples of further dicarboxylic acids which can be used are the di- or poly-ester-dicarboxylic acids obtained from aliphatic diols and aliphatic or cycloaliphatic dicarboxylic acids. Such ester-dicarboxylic acids are also known and can be prepared, for example, by the process disclosed in British Pat. No. 1,164,584, by subjecting n mols of an aliphatic diol, where n is a number from 1 to 50, to a polycondensation reaction with n+1 mols of an aliphatic or cycloaliphatic dicarboxylic acid, if desired in the presence of a catalyst.

Examples of suitable polycarboxylic acid anhydrides which can be employed together with the curing accelerators to be used according to the invention, for curing epoxide resins, are: cycloaliphatic polycarboxylic acid anhydrides, such as tetrahydrophthalic anhydride, methyltetrahydrophthalic anhydride, hexahydrophthalic anhydride, methylenehexahydrophthalic anhydride, endomethylenetetrahydrophthalic anhydride, methylendomethylene-tetrahydrophthalic anhydride (=methylnadic anhydride), the Diels-Alder adduct of 2 mols of maleic anhydride and 1 mol of 1,4-bis-(cyclopentadienyl)-2-butene, the eutectic mixtures of these polycarboxylic acid anhydrides and also mixtures of the isomers of the methylsubstituted tetrahydrophthalic anhydrides, or certain aromatic polycarboxylic acid anhydrides, such as trimellitic anhydride or pyromellitic anhydride.

Examples of suitable polyhydric phenols which can be used together with the compounds of the formula I for curing epoxide resins are: resorcinol, hydroquinone, 2-ethylhydroquinone, 2-methylhydroquinone, 2,6-diethylhydroquinone, pyrocatechol, 3-methylpyrocatechol, 4-ethylpyrocatechol, 2,6-dihydroxytoluene, dihydroxynaphthalenes and in particular the bisphenols, such as bisphenol A and bisphenol F.

The curing catalysts and curing accelerators used according to the invention are liquid to viscous substances of low volatility which also vaporise to only a slight extent during processing of the mixtures according to the invention, so that troublesome odours hardly arise. As a result of the low vapour pressure of the curing catalysts and curing accelerators used according to the invention it is possible to prevent imperfect curing, for example at the surface of mouldings, due to the evaporation of the curing catalyst, or the formation of blisters during the curing process. The mouldings produced from the mixtures according to the invention also have good stability to humidity.

The curable epoxide resin mixtures according to the invention are used in particular in the fields of surface protection, electrical engineering, laminating processes and adhesive technology and in the building trade. They can be used in a formulation suited in each case to the particular application, in the unfilled or filled state, if desired in the form of solutions or emulsions, as paints, lacquers, compression moulding compositions, injection moulding formulations, dipping resins, casting resins, impregnating resins and binders and as tooling resins, laminating resins, sealing and filling compositions, flooring compositions and binders for mineral aggregates.

The mixtures according to the invention are preferably used as laminating resins and in particular as adhesive resins.

In the examples which follow parts are by weight; percentages are by weight unless indicated otherwise.

Preparation of the amine adducts

Example A: 51.0 g (0.5 mol) of dimethylaminopropylamine are initially introduced into a sulfonation flask and warmed to 120° C. under a nitrogen atmosphere. Without any further supply of heat, 150 g (1.0 mol) of industrially produced butyl glycidyl ether with an epoxide content of 6.67 equivalents/kg (theoretical value: 7.69 equivalents/kg) are added dropwise in the course of 60 minutes, with stirring, and during this addition the temperature of the reaction mixture rises to 130° C. as a result of the exothermic reaction. The reaction product is then kept at 120° C. for a further 2 hours. After cooling, a pale yellow, clear liquid of low viscosity is obtained. The resulting liquid consists of the adduct of 1 mol of dimethylaminopropylamine and 2 mols of industrially produced butyl glycidyl ether and corresponds to the compound of the following theoretical structure $$(CH_3)_2N\text{-}(CH_2)_3\text{-}N\text{-}(CH_2\text{-}\underset{\underset{OH}{|}}{CH}\text{-}CH_2\text{-}O\text{-}CH_2\text{-}CH_2\text{-}CH_2\text{-}CH_3)_2,$$

which is confirmed by the elementary analysis:

| calculated: | found: |
|---|---|
| C = 63.0% | C = 61.7% |
| H = 11.6% | H = 11.6% |
| O = 17.7% | O = 18.5% |
| N = 7.7% | N = 6.8% |
|  | Cl = 1.2% |

Example B: 51.0 g (0.5 mol) of dimethylaminopropylamine are initially introduced into a sulfonation flask and warmed to 120° C. under a nitrogen atmosphere. Without any further supply of heat, 75.0 g (0.5 mol) of butyl glycidyl ether as described in Example 1 are added dropwise in the course of 55 minutes, with stirring, and during this addition the temperature of the reaction mixture rises to 126° C. as a result of the exothermic reaction. After the dropwise addition is complete, the reaction product is kept at 130° C. for a further 60 minutes. After cooling, a pale yellow, clear liquid of low viscosity is obtained. The resulting liquid consists of the adduct of 1 mol of dimethylaminopropylamine and 1 mol of butyl glycidyl ether and corresponds to the following theoretical structural formula

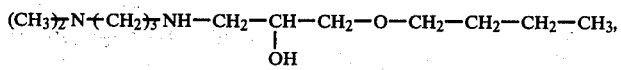

which is confirmed by the elementary analysis:

| calculated: | found: |
|---|---|
| C = 62.0% | C = 61.5% |
| H = 12.1% | H = 12.2% |
| O = 12.1% (13.7)$^x$ | O = 15.0% |
| N = 13.8% (12.2)$^x$ | N = 10.8% |

$^x$The corrected theoretical values for O and N which are given in brackets are obtained when the impurity in the technical grade butyl glycidyl ether used is taken into account.

Example C: 51.0 g (0.5 mol) of dimethylaminopropylamine are initially introduced into a sulfonation flask and warmed to 120° C. under a nitrogen atmosphere. Without any further supply of heat, 181 g (1.0 mol) of industrially produced cresyl glycidyl ether with an epoxide content of 5.52 equivalents/kg are added dropwise in the course of 53 minutes, with stirring, and during this addition the temperature of the reaction mixture rises to 126° C. as a result of the exothermic reaction. After the dropwise addition is complete, the reaction product is kept at 120° C. for 60 minutes. At room temperature, the resulting product is a pale yellow, clear liquid of moderate viscosity.

The adduct is composed of dimethylaminopropylamine and cresyl glycidyl ether in a molar ratio of 1:2 and corresponds to the compound of the following structural formula

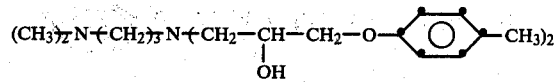

which is confirmed by the elementary analysis:

| calculated: | found: |
|---|---|
| C = 69.8% | C = 69.8% |
| H = 8.8% | H = 8.9% |
| O = 14.9% (15.4)[xx] | O = 15.2% |
| N = 6.5% (5.9)[xx] | N = 6.0% |

Example D: 51.0 g (0.5 mol) of dimethylaminopropylamine are initially introduced into a sulfonation flask and warmed to 120° C. under a nitrogen atmosphere. Without any further supply of heat, 90.5 g (0.5 mol) of cresyl glycidyl ether as described in Example 3 are added dropwise in the course of 16 minutes, with stirring, and during this addition the temperature of the reaction mixture rises to 171° C. as a result of the exothermic reaction. The reaction product is then kept at 120° C. for a further 30 minutes. After cooling, a pale yellow liquid of low viscosity is obtained.

The adduct is composed of dimethylaminopropylamine and cresyl glycidyl ether in a molar ratio of 1:1 and corresponds to the compound of the following structural formula

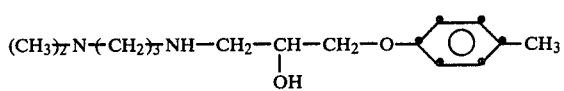

which is confirmed by the elementary analysis:

| calculated: | found: |
|---|---|
| C = 67.6% | C = 67.3% |
| H = 9.8% | H = 9.6% |
| O = 12.0% (13.0)[xx] | O = 13.0% |

| calculated: | found: |
|---|---|
| N = 10.5% (9.4)[xx] | N = 9.4% |

[xx]The corrected theoretical values for O and N which are given in brackets are obtained when the impurities in the technical grade cresyl glycidyl ether used are taken into account.

Example E: 20.4 g (0.2 mol) of dimethylaminopropylamine are initially introduced into a sulfonation flask and warmed to 95° C. under a nitrogen atmosphere. Without any further supply of heat, a mixture of 30 g (0.2 mol) of industrially produced butyl glycidyl ether and 36.2 g (0.2 mol) of industrially produced cresyl glycidyl ether are added dropwise in the course of 17 minutes, and during this addition the temperature of the reaction mixture rises to 124° C. as a result of the exothermic reaction. The reaction product is then kept at 140° C. for a further 30 minutes. After cooling, a pale yellow liquid of low viscosity is obtained.

The adduct is composed of dimethylaminopropylamine, butyl glycidyl ether and cresyl glycidyl ether in a molar ratio of 1:1:1 and corresponds to the mean structural formula:

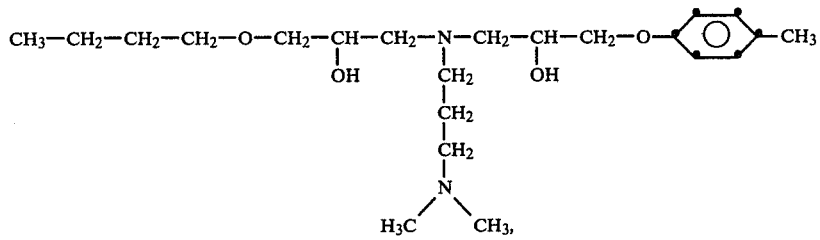

| Products tested | VAPOUR PRESSURE (Pa) at | | |
|---|---|---|---|
| | 20° C. | 50° C. | 100° C. |
| $(CH_3)_2N{-}(CH_2)_3{-}NH_2$ | $1.0 \times 10^2$ | $1.2 \times 10^3$ | $3.3 \times 10^4$ |
| $(CH_3)_2N{-}(CH_2)_3{-}NH{-}(CH_2)_3{-}NH_2$ | $8.0 \times 10^{-1}$ | $1.2 \times 10^1$ | $4.0 \times 10^2$ |
| $(CH_3)_2N{-}(CH_2)_3{-}NH{-}(CH_2)_2{-}CN$ | $9.3 \times 10^{-1}$ | $1.3 \times 10^1$ | $4.7 \times 10^2$ |
| 1-Methylimidazole | $2.7 \times 10^1$ | $2.0 \times 10^2$ | $2.7 \times 10^3$ |
| Benzyldimethylamine | $2.7 \times 10^2$ | $1.3 \times 10^3$ | $8.0 \times 10^3$ |
| Compound according to Example A | $3.5 \times 10^{-2}$ | $1.9 \times 10^{-1}$ | 2.0 |
| Compound according to Example B | $1.3 \times 10^{-1}$ | $8.0 \times 10^{-1}$ | 7.3 |
| Compound according to Example C | $6.1 \times 10^{-3}$ | $4.0 \times 10^{-2}$ | $4.5 \times 10^{-1}$ |
| Compound according to Example D | $4.8 \times 10^{-2}$ | $3.1 \times 10^{-1}$ | 3.7 |
| Compound according to Example E | $2.3 \times 10^{-2}$ | $1.1 \times 10^{-1}$ | 2.0 |

Example F: 20.4 g (0.2 mol) of dimethylaminopropylamine are initially introduced into a sulfonation flask and warmed to 100° C. under a nitrogen atmosphere. 38.2 g (0.2 mol) of 2-ethylhexyl glycidyl ether (isooctyl glycidyl ether) with an epoxide content of 5.23 equivalents/kg are added dropwise in the course of 30 minutes, with stirring and whilst heating gently. After the dropwise addition is complete, the reaction product is kept at 120° C. for 30 minutes. At room temperature, the resulting product is a pale, slightly turbid liquid of low viscosity. The adduct is composed of dimethylaminopropylamine and 2-ethylhexyl glycidyl ether in a molar ratio of 1:1 and corresponds to the compound of the following structural formula:

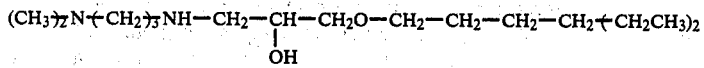

Example G: 20.4 g (0.2 mol) of dimethylaminopropylamine are initially introduced into a sulfonation flask and warmed to 100° C. under a nitrogen atmosphere. 75.5 g (0.2 mol) of dibromocresyl glycidyl ether with an epoxide content of 2.65 equivalents/kg (theoretical value: 3.11 equivalents/kg) are added dropwise in the course of 37 minutes, with stirring. After the dropwise addition is complete, the reaction product is kept at 120° C. for 30 minutes. At room temperature, the resulting product is a viscous, dark yellow mass. The adduct is composed of dimethylaminopropylamine and dibromocresyl glycidyl ether in a molar ratio of 1:1 and corresponds to the following structural formula:

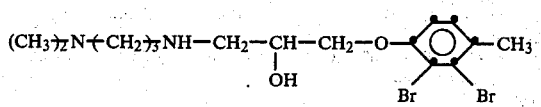

which, taking into account the impurities in the cresyl glycidyl ether used, is confirmed by the elementary analysis:

| calculated: | found: |
|---|---|
| C = 42.5% | C = 41.4% |
| H = 5.7% | H = 5.4% |
| O = 7.6% | O = 5.4% |
| N = 6.6% | N = 8.4% |
| Br = 37.7% | Br = 39.4% |

Example 1: 187 g (1.0 equivalent) of a bisphenol A diglycidyl ether with an epoxide content of 5.3 equivalents/kg, 154 g (1.0 equivalent anhydride group) of hexahydrophthalic anhydride and 1.8 g (0.5% by weight) of the amine adduct prepared in Example A are mixed at 80° C. and the mixture is then freed from the air stirred in and from moisture by placing briefly in a vacuum cabinet under 2 kPa. The resin is poured into a mould, which is made of Anticorodal (aluminium alloy) and has been pre-warmed to 100° C., and is cured for 4 hours at 100° C. and for 12 hours at 160° C. The following properties are determined for the resulting moulded sheet:

Flexural strength (according to VSM 77103) = 135 N/mm$^2$
Flexural strength (according to VSM 77103) after storing in boiling water for 60 days = 52 N/mm$^2$
Deflection (according to VSM 77103) = 9 mm
Deflection (according to VSM 77103) after storing in boiling water for 60 days = 2 mm
Absorption of water after 4 days at 23° C. = 0.15% by weight
Absorption of boiling water after 60 days at 100° C. = 2.2% by weight
Glass transition temperature (TMS$^x$), 10° C./minute) = 135° C.

$^x$) TMS = Thermomechanical Scanning Calorimeter (Perkin Elmer).

Comparison I 187 g (1.0 equivalent) of the bisphenol A diglycidyl ether described in Example 1, 154 g (1.0 equivalent) of hexahydrophthalic anhydride and 1.8 g (0.5% by weight) of 1-methylimidazole are processed, cured and tested, using the procedure described in Example 1.

Flexural strength (according to VSM 77103) = 133 N/mm$^2$
Flexural strength (according to VSM 77103) after storing in boiling water for 60 days = 18 N/mm$^2$
Deflection (according to VSM 77103) = 11 mm
Deflection (according to VSM 77103) after storing in boiling water for 60 days = 1 mm
Absorption of water after 4 days at 23° C. = 0.20% by weight
Absorption of boiling water after 60 days at 100° C. = 2.6% by weight
Glass transition temperature (TMS, 10° C./minute = 138° C.

It can be seen from the comparison that when 1methylimidazole is used as the curing accelerator for the anhydride-curing the resulting mouldings have distinctly less advantageous properties in respect of the absorption of water.

Example 2: 175 g (1.0 equivalent) of a novolac glycidyl ether with an epoxide content of 5.7 epoxide equivalents/kg, 55.8 g (0.9 equivalent) of 2,6-dihydroxytoluene and 1.2 g of the amine adduct prepared in Example A are mixed at 110°-120° C. The mixture is freed from the air stirred in and from moisture by placing briefly in a vacuum cabinet under about 2 kPa. The reaction mixture is poured into a pre-warmed Anticorodal mould and cured for 16 hours at 160° C. The following properties are determined for the cured moulded sheets:

Flexural strength (according to VSM 77103) = 138 N/mm$^2$
Flexural strength (according to VSM 77103) after storing in water at 140° C. for 5 days = 106 N/mm$^2$
Flexural strength (according to VSM 77103) after storing in water at 140° C. for 17 days = 98 N/mm$^2$
Deflection (according to VSM 77103) = >20 mm
Deflection (according to VSM 77103) after storing in water at 140° C. for 5 days = 6.5 mm
Deflection (according to VSM 77103) after storing in water at 140° C. for 17 days = 4.6 mm
Impact strength (VSM 77105) = 83 N mm/mm$^2$
Impact strength (VSM 77105) after storing in water at 140° C. for 5 days = 32 N mm/mm$^2$
Impact strength (VSM 77105) after storing in water at 140° C. for 17 days = 15 N mm/mm$^2$
Absorption of water at 140° C. after 5 days = 4,3% by weight
Absorption of water at 140° C. after 17 days = 4,2% by weight Comparison II 175 g (1.0 equivalent) of a novolac glycidyl ether described in Example 2, 55.8 g (0.9 equivalent) of 2,6-dhydroxytoluene and 0.23 g benzyldimethylamine are mixed at 110°-120° C. The mixture is processed, cured and tested, using the procedure described in Example 2.

Flexural strength (according to VSM 77103) = 140 N/mm$^2$
Flexural strength (according to VSM 77103) = after storing in water at 140° C. for 5 days = 107 N/mm$^2$
Flexural strength (according to VSM 77103) = after storing in water at 140° C. for 17 days = 31 N/mm$^2$
Deflection (according to VSM 77103) = 18,3 mm
Deflection (according to VSM 77103) after storing in water at 140° C. for 5 days = 5,1 mm Deflection (according to VSM 77103) after storing in water at 140° C. for 17 days=2,0 mm
Impact strength (VSM 77105)=62 N mm/mm$^2$
Impact strength (VSM 77105) after storing in water at 140° C. for 5 days=10 N mm/mm$^2$
Impact strength (VSM 77105) after storing in water at 140° C. for 17 days=3 N mm/mm$^2$
Absorption of water at 140° C. after 5 days=4,6% by weight
Absorption of water at 140° C. after 17 days=4,9% by weight Example 3: 100 g of bisphenol A diglycidyl ether with an epoxide content of 5.34 equivalents/kg and 8 g of the amine adduct prepared in Example A are mixed at 50° C. and the mixture is freed from the air stirred in and from moisture by placing briefly in a vacuum cabinet under about 2 kPa. The resin is poured into an Anticorodal mould which has been treated beforehand with a silicone release agent (QZ 13) and has been pre-warmed to 70° C. After a heat treatment for 4 hours at 70° C. and 12 hours at 140° C., a moulded sheet is obtained which is difficult to release from the mould; the following properties are determined for this sheet:

Flexural strength (FS) (according to VSM 77103)=114 N/mm$^2$
Deflection (D) (according to VSM 77103)=11.0 mm
Heat distortion point (HDP) (according to ISO R 75)=98° C.
Absorption of water (AW) after storing in water at 23° C. for 4 days=0.21% by weight The following mixtures are processed and cured by the same procedure and the physical properties of the resulting mouldings are measured:

| Compounds and amounts added per 100 parts of bisphenol A diglycidyl ether: Experiment | | FS N/mm$^2$ | D mm | HDP °C. | AW % by weight |
|---|---|---|---|---|---|
| a | 8 parts of the compound according to Example B | 120 | 8.8 | 60 | 0.16 |
| b | 8 parts of the compound according to Example C | 124 | 8.6 | 103 | 0.32 |
| c | 8 parts of 1-methyl-imidazole | 113 | 4.9 | 102 | 0.60 |
| d | 4 parts of 1-methyl-imidazole | 118 | 5.9 | 141 | 0.35 |
| e | 4 parts of benzyl-dimethylamine | 114 | 5.9 | 119 | 0.21 |
| f | 8 parts of dimethyl-aminopropylamine | 132 | 10.7 | 81 | 0.25 |
| g | 4 parts of dimethyl-aminopropylamine | 110 | 10.6 | 116 | 0.70 |
| h | 8 parts of (CH$_3$)$_2$N(CH$_2$)$_3$NH(CH$_2$)$_3$NH$_2$ | 111 | 6.0 | 93 | 0.71 |
| i | 4 parts of (CH$_3$)$_2$N(CH$_2$)$_3$NH(CH$_2$)$_3$NH$_2$ | 97 | 6.0 | 120 | 0.27 |

Experiments d, e, g and i are carried out using half the amount of curing catalyst, since the compounds according to the invention have a higher molecular weight, based on the catalytically active groups.

The comparison experiments show that when 1methylimidazole and benzyldimethylamine are used mouldings of considerably lower flexibility (deflection at break) are obtained.

The use of dimethylaminopropylamine results in mouldings which have a considerably higher sensitivity to moisture (absorption of water).

Examples 4 to 6: 100 g of bisphenol A diglycidyl ether with an epoxide content of 5.34 equivalents/kg are mixed at 50° C. with 4 g of the amine adduct prepared in Example F or with 4 g or with 8 g of the amine adduct prepared in Example G and the mixtures are freed from the air stirred in and from moisture by placing briefly in a vacuum cabinet under about 2 kPa. The resin mixtures are poured into Anticorodal moulds, which have been treated beforehand with a silicone release agent (QZ 13) and have been pre-warmed to 70° C. After a heat treatment for 4 hours at 70° C. and 12 hours at 140° C., moulded sheets are obtained; the following properties are determined for the sheets:

| | Example 4 4 g of amine adduct F | Example 5 4 g of amine adduct G | Example 6 8 g of amine adduct G |
|---|---|---|---|
| Flexural strength (VSM 77103) | 116 N/mm$^2$ | 132 N/mm$^2$ | 111 N/mm$^2$ |
| Flexural strength after storing in water at 100° C. for 60 days | 102 N/mm$^2$ | 86 N/mm$^2$ | 107 N/mm$^2$ |
| Deflection (VSM 77103) | 8.0 mm | 9.9 mm | 6.4 mm |
| Deflection after storing in water at 100° C. for 60 days | 5.2 mm | 3.3 mm | 5.2 mm |
| Heat distortion point (ISO R 75) | 121° C. | 92° C. | 117° C. |
| Absorption of water after storing in water at 23° C. for 4 days | 0.23% | 0.19% | 0.20% |
| Absorption of water after storing in water at 100° C. for 60 days | 3.00% | 4.45% | 2.62% |

Example 7: 187 g (1.0 equivalent) of a bisphenol A diglycidyl ether with an epoxide content of 5.3 equivalents/kg, 154 g (1.0 equivalent anhydride group) of hexahydrophthalic anhydride and 1.8 g (0.5% by weight) of the amine adduct prepared in Example F are mixed at 80° C. and the mixture is then freed from air stirred in and from moisture by placing briefly in a vacuum cabinet under 2 kPa. The resin is poured into a mould, which is made of Anticorodal (aluminium alloy) and has been pre-warmed to 100° C., and is cured for 4 hours at 100° C. and for 12 hours at 160° C. The following properties are determined for the resulting moulded sheet:

Flexural strength (according to VSM 77103)=136 N/mm$^2$
Flexural strength after storing in boiling water for 60 days=146 N/mm$^2$ Deflection (according to VSM 77103)=7.9 mm Deflection after storing in boiling water for 60 days=7.4 mm Absorption of water after 4 days at 23° C.=0.20% by weight Absorption of boiling water after 60 days at 100° C.=1.29% by weight Glass transition temperature (TMS, 10° C./minute)=144° C.

Example 8

(a) Preparation of polyester-dicarboxylic acid I 32.9 kg (225 mols) of adipic acid, 26.06 kg (218.57 mols+1% excess) of 1,6-hexanediol (corresponding to a molar ratio of 35:34), 236 g (0.4% by weight) of the catalyst prepared in Example D and 177 g (0.3% by weight) of di-n-octadecyl 3,5-di-tert.-butylbenzylphosphonate as the catalyst are heated to 165° C. under a nitrogen atmosphere, 6.75 kg (86% of theory) of water being distilled off continuously in the course of 8 hours. The condensation reaction is then brought to completion at 173° C. under $2 \times 10^3$ Pa. The resulting polyester is crystalline and has a melting point of 65° C. and an acid equivalent weight of 3,060 (theoretical value: 3,951).

(b) Production of mouldings 10.0 kg (3.27 equivalents) of polyester-dicarboxylic acid I and 624 g (3.27 equivalents) of an epoxide novolac with an epoxide content of 5.24 equivalents/kg are mixed at 100° C. and the mixture is poured into aluminium moulds of the following dimensions: 400×500×50 mm and 145×1 mm.

After curing for 6 hours at 130° C., mouldings are obtained which are crystalline at room temperature and are rubbery and elastic above 60° C.

Tensile strength according to DIN 53455=15.6 N/mm$^2$

Elongation at break according to DIN 53455=206%

Crystallisation transition temperature (DSC-2, 10° C./minute)=55° C.

The example shows that the catalyst used according to the invention is also suitable for the preparation of polyester-dicarboxylic acids (polycondensation reaction) and subsequently is also effective for curing the epoxide resin (polyaddition reaction).

What is claimed is:

1. A curable mixture comprising a polyepoxide compound having on average more than one epoxide group in the molecule, and optionally a polycarboxylic acid, an anhydride or a polyhydric phenol as the curing agent, the said mixture additionally containing a compound of the formula I

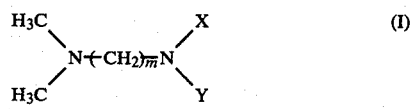

in which m is a number from 3 to 10, X is a group of the formula

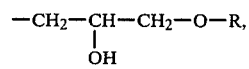

in which R is an alkyl having 4 to 10 C atoms or a phenyl which is unsubstituted or substituted by chlorine, bromine or alkyl or alkoxy each having 1 to 3 C atoms, and Y is a hydrogen atom or has the meaning defined for X, as the curing catalyst or as the curing accelerator for curing the epoxide compound with di- or poly-carboxylic acids or anhydrides of di- or poly-carboxylic acids or with polyhydric phenols.

2. A mixture according to claim 1, comprising a compound of the formula I as the curing catalyst or curing accelerator for curing the epoxide compound with polycarboxylic acid anhydrides or polyhydric phenols.

3. A mixture according to claim 1, comprising a compound of the formula I in which m is 3, R is butyl, phenyl or tolyl and Y is a hydrogen atom or has the meaning defined for X.

4. A mixture according to claim 1, comprising a compound of the formula I in which m is 3, R is isooctyl and Y is a hydrogen atom.

5. A mixture according to claim 1, which comprises an epoxide compound and a compound of the formula I, the proportion of the compound of the formula I in the mixture being 2 to 40% by weight.

6. A mixture according to claim 1, wherein the proportion of the compound of the formula I is 3 to 16% by weight.

7. A mixture according to claim 1, which comprises an epoxide compound, a polycarboxylic anhydride or a polyhydric phenol and a compound of the formula I, the proportion of the compound of the formula I being 0.1 to 10% by weight, based on the epoxide resin/curing agent mixture.

8. A mixture according to claim 1, wherein the proportion of the compound of the formula I is 0.2 to 2% by weight.

9. A compound of the formula I according to claim 1, in which m is a number from 3 to 10 and X and Y are each a group of the formula

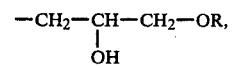

in which R is an alkyl having 4 to 10 C atoms or a phenyl which is unsubstituted or substituted by chlorine, bromine or alkyl or alkoxy each having 1 to 3 C atoms.

10. A compound of the formula I according to claim 1, in which m is the number 3 and X and Y are each a grouping of the formula

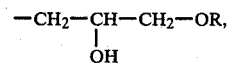

in which the R's independently of one another are each a butyl, phenyl or tolyl.

* * * * *